(No Model.)
D. R. MILLER.
RUBBER FOR BLACKBOARDS.
No. 473,558. Patented Apr. 26, 1892.
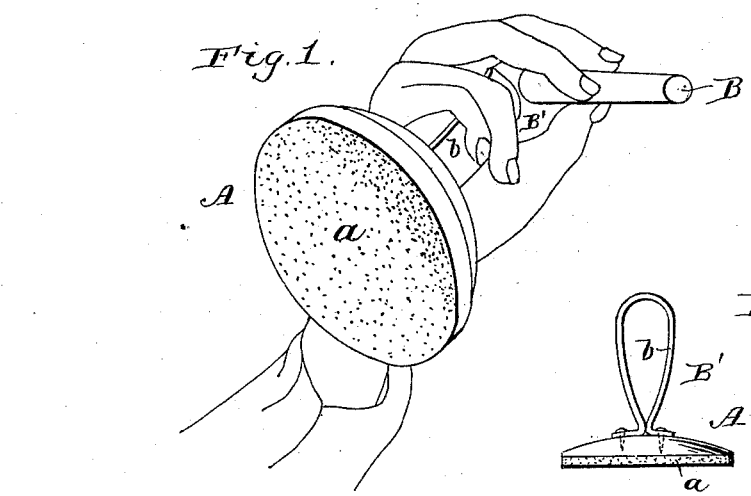
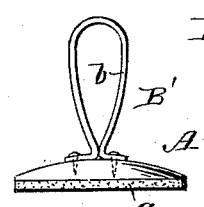
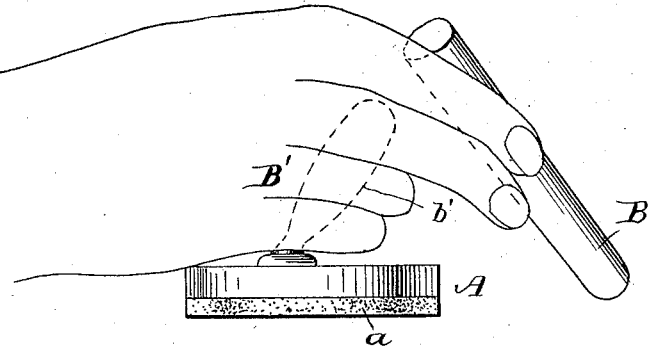
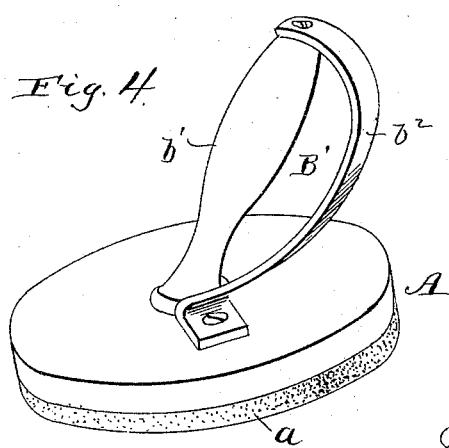
Witnesses:
F. H. Benjamin
J. S. Barker
Inventor:
Dera R. Miller
by H. N. Low
attorney
THE NORRIS PETERS CO., PHOTO-LITHO., WASHINGTON, D. C.

United States Patent Office.

DORA RICHARDS MILLER, OF NEW ORLEANS, LOUISIANA.

RUBBER FOR BLACKBOARDS.

SPECIFICATION forming part of Letters Patent No. 473,558, dated April 26, 1892.

Application filed August 5, 1891. Serial No. 401,729. (No model.)

*To all whom it may concern:*

Be it known that I, DORA RICHARDS MILLER, a citizen of the United States, residing at New Orleans, in the parish of Orleans and State of Louisiana, have invented certain new and useful Improvements in Rubbers for Blackboards; and I do declare the following to be a full, clear, and exact description of the invention, such as will enable others skilled in the art to which it appertains to make and use the same, reference being had to the accompanying drawings, and to the letters of reference marked thereon, which form a part of this specification.

It is the object of my invention to provide a blackboard rubber or eraser adapted for the removal of chalk-marks which can be carried by the same hand in which the crayon is held without interfering with the free use of the latter.

Chalk-marks may by this improved rubber be erased with great rapidity by the same hand with which the writing is done without the delay and inconvenience usually involved in laying down the crayon and taking the rubber and then laying down the rubber and resuming the crayon. By my improvement much time is saved and the left hand remains free to hold a book, as is often necessary.

With such objects in view my invention consists in the parts and combinations thereof hereinafter particularly set forth and claimed.

In order to make my improvement more clearly understood, I have shown in the accompanying drawings means for carrying the same into practical effect without, however, intending to limit the invention to the precise constructions which, for the sake of illustration, I have delineated.

In said drawings, Figure 1 is a perspective view of a rubber embodying my improvement, shown as attached to the hand in such manner as not to interfere with the use of the crayon, the latter also being shown. Fig. 2 is a view of the rubber from what may be called the "side." Fig. 3 is a side view of a hand and crayon, showing a rubber of modified construction. Fig. 4 is a perspective view of another modification.

Referring to the drawings, A indicates the rubber, having a suitable rubbing or erasing surface $a$.

B is the chalk or crayon.

In order that the fingers may be free to hold the crayon and in order that the rubber may not encounter the face of the blackboard and interfere with the movement of the hand in writing, it is essential that the rubber be held upon that edge of the hand at which the little finger is situated, the rubber being operated by the pressure, not of the palm or of the fingers, but by that of the edge or side of the hand. When so held, the rubber will neither strike against the board in writing nor will the freedom of the thumb and fingers by which the crayon is held be interfered with.

Referring to Figs. 1 and 2, B' is the securing means, situated opposite to the rubbing-surface $a$, consisting in this instance of a strap, as shown at $b$, shaped to fit the middle portion of the hand, lying close to the back and palm thereof, and adapted to hold the rubber against the edge of the hand or abductor-muscle of the little finger.

In Fig. 3 the securing means B' is an inclined rigid post or handle, as shown at $b'$, at an acute angle to the plane of the rubber, situated opposite to the rubbing-surface $a$ and to the plane of the blackboard when the rubber is at rest thereon. This post passes along the palm or interior of the hand for a short distance and is held in place by the third and fourth fingers. The rigid post may have a strap, as shown at $b^2$, passing from its top around the hand to its (the post's) base, as seen in Fig. 4. In such case the fingers need not be kept retracted to hold the post until it is desired to make an erasure, and then the post will furnish a rigid means by which the rubber can be more forcibly and positively operated; but the main feature of my invention consists in the rubber held on the edge or side of the hand out of the way of the crayon-holding fingers and of the blackboard.

Having thus described my invention, what I claim is—

The herein-described blackboard-rubber, having the rubbing-surface $a$ and provided with the securing means B', situated opposite to the said rubbing-surface, by which the rubber is held at the edge of the hand of the operator, enabling it to be held and used by the same hand as the crayon, substantially and for the purposes set forth.

In testimony whereof I affix my signature in presence of two witnesses.

DORA RICHARDS MILLER.

Witnesses:
 KATE A. WHITE,
 JOHN STEPHEN.